United States Patent [19]

Scott et al.

[11] 4,217,388

[45] Aug. 12, 1980

[54] PRESSURE-SENSITIVE TRANSFER ELEMENTS AND PROCESS

[75] Inventors: Michael A. Scott, Huntington; Albert E. Brown, Glen Cove; Edward Young, Manhasset, all of N.Y.

[73] Assignee: Columbia Ribbon and Carbon Mfg. Co., Inc., Plainview, N.Y.

[21] Appl. No.: 889,661

[22] Filed: Mar. 27, 1978

[51] Int. Cl.[2] .......................... B32B 3/26; B32B 5/18

[52] U.S. Cl. .................................. 428/307; 427/146; 427/412.5; 428/914

[58] Field of Search ............... 427/144, 146, 302, 152, 427/245, 407 G, 407 C, 407 R, 373, 379; 428/307, 320, 480, 483, 914

[56] References Cited

U.S. PATENT DOCUMENTS

| | | | |
|---|---|---|---|
| 3,037,879 | 6/1962 | Newman et al. | 427/146 |
| 3,080,954 | 3/1963 | Newman et al. | 427/146 |
| 3,102,824 | 9/1963 | Newman | 427/152 |
| 3,467,539 | 9/1969 | Schlotzhauer et al. | 428/307 |
| 3,671,287 | 6/1972 | Maniar | 428/480 |
| 3,904,802 | 9/1975 | Brown et al. | 427/152 |
| 4,087,579 | 5/1978 | Newman | 428/914 |
| 4,092,456 | 5/1978 | Newman et al. | 427/373 |

*Primary Examiner*—Michael F. Esposito
*Assistant Examiner*—Sadie L. Childs
*Attorney, Agent, or Firm*—Thomas L. Tully

[57] ABSTRACT

A thin, pressure-sensitive, ink-releasing transfer element such as a ribbon capable of releasing a substantially uniform and intense amount of smudge-resistant ink at least about four times from overlapping impressed areas of the ink layer corresponding to each double image width during high speed printing use on "hammer-impression" high speed typewriters. The thinness of the ribbon is important not only to accommodate a maximum amount of ribbon on the feed spool, but primarily in order to provide a ribbon which is operative in such typewriters to produce images having excellent sharpness, uniform intensity, edge profile and freedom from pick-over, which properties also result from the cooperative nature of the ink and undercoating used on such ribbons. The present method involves applying an ink layer comprising a microporous resinous binder containing pressure-exudable, substantially-solid, thixotropic ink having a viscosity of at least about 100,000 centipoises and containing a hydrophilic pigment and a wetting agent having both hydrophilic and oleophilic radicals, by means of a volatile coating vehicle comprising a miscible mixture of (a) a volatile liquid solvent which is a solvent for the resinous binder and for the ink vehicle but is a non-solvent for the wetting agent and (b) another less volatile liquid which is a solvent for the wetting agent and for the ink vehicle but is a non-solvent for the resinous binder.

17 Claims, No Drawings

PRESSURE-SENSITIVE TRANSFER ELEMENTS AND PROCESS

BACKGROUND OF THE INVENTION

In the past, pressure-sensitive, reusable transfer elements were developed as an improvement over prior-known frangible transfer elements based upon hot-melt wax transfer layers. Such reusable transfer elements, both in ribbon and sheet form, were designed for reuse eight or more times in a typewriter or in a carbon form for manual use. For instance, ribbons of the reusable type were fed through a typewriter, in alternate forward and reverse directions, eight or more times and were then discarded when the ink supply diminished to the point that the images formed on the copy sheet lacked sufficient intensity or darkness, or when the ink layer began to flake or chip from its foundation.

Recently high speed typewriters have been developed which require the use of ribbons which are fed in only one direction, are overstruck or impressed at least about four times in each length of the ribbon corresponding to the width of two characters, and are discarded after a single pass. Such high speed typewriters, including the Xerox 800 electronic typewriter, and printers as disclosed in U.S. Pat. No. 3,954,163, carry an impression element which moves at a tremendous speed so that its duration of contact pressure with the typing ribbon is much less than in the case of conventional electric typewriters. Conventional reusable typewriter ribbons cannot be used successfully on such high speed typewriters because they do not produce typed images having good edge definition, absence of fill-in, sufficient sharpness and clarity and sufficient color intensity or uniformity of intensity and smudge-resistance under the conditions of use.

OBJECTS OF THE INVENTION

It is the principal object of the present invention to provide novel thin, pressure-sensitive, ink-releasing elements capable of releasing substantially-uniform, intense amounts of highly dispersed, low cohesion ink from the same overstruck area for at least about four rapid impressions thereof to produce images having good edge definition, freedom from fill-in and which are sharp, clear smudge-resistant and of uniform high intensity.

It is another object of this invention to provide novel pressure-sensitive, ink-releasing ribbons which are as thin as possible so as to accommodate as great a length as possible on a given supply spool but which have sufficient strength to resist breakage during the high speed imaging process and sufficient tenacity of the thin ink layer to resist flaking or picking of the ink layer as a result of the rapid multi-overstrike operation thereof.

It is yet another object of the present invention to provide novel pressure-sensitive, ink-releasing ribbons for high speed use, which ribbons contain a substantially-solid, thixotropic, pressure-exudable ink which transfers in uniform intense amounts during high speed printing operation.

These and other objects and advantages of the present invention will be apparent to those skilled in the art in the light of the present disclosure.

SUMMARY OF THE INVENTION

The present invention involves novel ink formulations and novel coating processes for producing transfer elements such as ribbons having a microporous resinous ink layer containing a highly dispersed substantially-solid, thixotropic ink having low cohesive strength.

The present ink compositions are especially formulated with hydraulic pigments, such as untreated carbon black, and certain insoluble wetting agents having both hydrophilic and oleophilic radicals to provide ink pastes which are thixotropic and substantially-solid and non-flowable at ordinary room temperatures and which have a viscosity of from about 100,000 centipoises to about 1,000,000 centipoises, as measured by a Brookfield Viscometer at ordinary room temperatures. In the past, semi-solid inks have been proposed for the production of squeeze-out type transfer elements for pencil or stylus imaging use, such as carbon forms in which the ink layer is in continuous contact with the copy sheet. Reference is made to U.S. Pat. No. 2,984,582 dated May 16, 1961. The semi-solid inks were resistant to migration or sweating and resultant staining of the copy sheet. Such prior-known inks did not include wetting agent which were insoluble in the volatile coating vehicles, and even though they have high viscosities, they are unsuitable for use according to the present invention, even where their viscosity is within the present range, because the absence of the combination of hydrophilic pigments and wetting agents having the desired solubility properties prevents such inks from becoming highly dispersed within the resin binder and from providing smudge-resistant images of uniform high intensity and good edge profile on the high speed printing machines discussed supra.

It is not completely clear why or how the combination of hydrophilic pigments, such as untreated carbon blacks and selectively-soluble wetting agents, functions to provide the ink-transfer characteristics necessary for the present multi-strike ribbons, i.e., the formation of at least four uniformly intense, smudge-resistant images from each overlapping area of the transfer layer at the speed of about 40 images per second. However, it appears that the following factors are involved. Untreated carbon blacks are more hydrophilic than treated or toned carbon blacks, because such treatment displaces the natural oxygen which is chemisorbed on the porous surface of carbon blacks during the formation thereof. Hydrophilic pigments, such as carbon blacks containing such surface oxygen, have a strong affinity or bonding power for the hydrophilic polar group or radical of the wetting agent. The oleophilic polar group or radical of the wetting agent has strong affinity for the oleaginous ink vehicle and thus, the wetting agent functions to link the pigment to the oleaginous vehicle and to prevent it from bonding to the resin phase or from becoming trapped therein and lost for transfer purposes. Also, the ink layer must be applied by means of a volatile coating vehicle comprising a miscible mixture of (a) at least one volatile solvent which is a solvent for the resin binder material and for the oleaginous ink vehicle but is a non-solvent for the wetting agent, and (b) at least one less-volatile liquid which is a solvent for the wetting agent and for the oleaginous ink vehicle but is a non-solvent for the resinous binder material, the wetting agent and the resinous binder material both being dissolved but in different liquid phases. All of the ingredients which are soluble in the more volatile solvent(s), such as the resin and the oleaginous ink vehicle, are drawn to the surface of the ink layer during evaporation of the more volatile solvent(s) and are deposited or solidified at said surface as their solvent is removed. If the wetting agent is also soluble in the volatile solvent(s) for the resinous binder material, it also is drawn to the surface of the ink layer with said solvent(s) and attracts or draws the carbon black with it. Such concentration of ink at the surface of the ink layer renders the latter dirty to the touch and results in an ink layer which produces first images which are too pigment-rich and which smudge easily on contact with the hands, and subsequent images from overlapping areas of the ink layer which contain smaller amounts of pigment so that they are visibly less intense then each other.

According to the present invention, the wetting agent is insoluble in the more volatile liquid which is a solvent for the resin binder material but is soluble in a less volatile liquid which is a non-solvent for the resin binder material and a solvent for the oleaginous ink vehicle but which is miscible with the more volatile solvent. The effect of the different solubilities and volatilities is that the wetting agent is not drawn toward the surface of the ink layer during drying until after the more volatile liquid has been evaporated and the resin and incompatible oleaginous ink vehicle have been deposited and solidified at the surface of the ink layer. At this point, the less volatile liquid begins to move toward the surface of the ink layer and carries the wetting agent with it. The less volatile liquid, being a solvent for the oleaginous ink vehicle and a non-solvent for the resinous binder material, selectively dissolves or softens the oleaginous ink vehicle and passes to the surface of the layer, from which it is evaporated. The wetting agent is carried into the oleaginous ink vehicle with the less volatile solvent, attracting the hydrophilic pigment with it, and is selectively deposited therein as the less volatile solvent is evaporated and drying of the ink layer is completed. In this way, the wetting agent is selectively deposited in the oleaginous ink vehicle, which ink vehicle is incompatible with the resin binder and is present in the form of micropores dispersed throughout the resin binder material. The wetting agent has an affinity for both the oleaginous ink vehicle and for the hydrophilic pigment and thus draws the pigment into the micropores to form a multiplicity of pressure-exudable ink deposits dispersed within a skeletal structure of the resinous binder material.

The novel liquid coating vehicle of the present invention comprises a miscible mixture which generally contains a major amount by weight, based upon the total weight of the coating vehicle, of at least one active solvent for the resin binder material such as an aliphatic ketone and/or ester, and a minor amount of weight of at least one non-solvent for the resin which is a solvent for the wetting agent. Thus, solvents such as methyl ethyl ketone and/or ethyl acetate may be used in amounts ranging from about 55% up to about 99% of the miscible mixture while less volatile liquids, such as high-boiling mineral oils, paraffin oils, cycloalkanes and mixtures of such materials, available under the Trademark Naphtholite, generally comprise a minor amount of the miscible mixture, i.e., from about 1% up to about 40% and most preferably from about 2% up to about 10% by weight of the mixcible mixture. The less volatile liquid preferably has a boiling point which is at least about 30° F. higher than the boiling point of the active solvent so that the drying of the ink layer occurs in two stages. The evaporation of the active solvent is completed prior to any substantial evaporation of the less volatile liquid. Thus the resin binder material has been concentrated and solidified at the evaporation surface prior to evaporation of the less volatile liquid. Since the oleaginous ink vehicle is soluble in the active solvent, it is uniformly mixed with the resin binder material; and since it is incompatible with the resin binder material, it separates therefrom as microparticles when the resin comes out of solution during drying, forming oleaginous pores within the skeletal structure of the resin binder. Also, since the oleaginous ink vehicle is soluble in the less volatile liquid containing the dissolved wetting agent, the latter solution selectively dissolves its way into the porous network as the less volatile liquid moves to the surface of the ink layer and is evaporated. The resinous binder material is not disturbed thereby, and none of the wetting agent or pigment finds its way into the binder material. Thus the binder material is not weakened by the inclusion of solid pigment particles, picking over of the binder material during typing use is substantially reduced, the typed images are cleaner and more smudge-resistant, and no pigment is trapped and lost in the binder material.

Another pigment, such as a blue toner, preferably is included in cases where the hydrophilic pigment is an untreated carbon black in order to tone or cover the brownish color of the untreated carbon black and produce a better black color.

As mentioned hereinbefore, the present inks as contained within the microporous resinous ink layers of the present invention are formulated so as to be substantially-solid at ordinary room temperatures, thixotropic and to have a viscosity of between about 100,000 and 1,000,000 centipoises, most preferably between about 300,000 and 600,000 centipoises, as measured on a Brookfield Viscometer. By "substantially-solid" is meant that the present inks are non-flowable, per se, under the effects of gravity and, at most, creep or migrate very slowly at the rate of about 1 inch or less per hour if a container of such ink is moved from vertical to horizontal position. By "thixotropic" is meant that the present inks are convertible from substantially-solid to flowable liquid condition under the effects of applied force such as stirring in a Brookfield Viscometer. The viscosity of the present inks is determined after stirring or mixing the inks for a few minutes until they reach their lowest viscosity.

Another critical feature of the novel thin, pressure-sensitive, ink-releasing elements of the present invention is a thin, strong, low-pressure-deformable plastic film foundation having a thickness of from about 0.0001 inch to about 0.0005 inch, most preferably tensilized Mylar (oriented polyethylene terephthalate polyester film) having a thickness of from about 0.00019 inch to about 0.00035 inch.

The film foundation is provided with a bonding layer or undercoating as a necessary element to anchor the ink layer to the foundation and prevent transfer of the microporous sponge structure of the ink layer which contains within the pores thereof the pressure-exudable ink. The bonding layer provides a continuous covering layer bonded to the film foundation and having a dry thickness of up to about 0.0001 inch and preferably no more than about 0.00005 inch. The bonding layer composition comprises a synthetic resinous binder material and a volatile solvent therefor which is a non-solvent for the film foundation.

A preferred resin binder for the bonding layer is a linear polyester formed by the reaction of dibasic aromatic acids, such as terephthatic acid with alkylene glycols, such as ethylene glycol. Such resins are commercially-available under the Trademark Vitel.

Most preferably, the bonding layer also comprises a minor amount of a resin which is at least partially soluble in the volatile solvent used to apply the ink layer thereover, so that the bonding layer becomes softened by that solvent and integrates with the ink layer to provide a solvent bond therebetween. For instance, a second resin such as vinyl chloride-vinyl acetate copolymer may be included in a ratio of from about 0.01 to about 0.4 parts by weight per part of the linear polyester.

The linear polyester bonding layers are tacky or sticky and, therefore, the ink layer must be applied thereover in an in-line coating operation, unless materials are added to the bonding layer to prevent sticking. Suitable additives are fillers, such as starch, clay, polymer spheres or other solids having a particle size greater than the thickness of the bonding layer so as to project above the surface thereof.

The present ribbons are generally used in narrow widths of 0.25 inch and 0.312 inch and are wrapped on spool cores in lengths of about 250 feet. Due to the slow feeding of the ribbon and the overstrike operation of the typewriter, at least about thirty-six or more images are typed from each inch of the ribbon length. When the ribbon has made a single pass through the typewriter, it is discarded, as opposed to conventional reusable ribbon use wherein the ribbon is reversed several times in the typewriter until it has made eight or more passes.

Such conventional reusable typewriter ribbons are not suitable for use in the new high speed "hammer-impression" typewriters which employ the present novel ribbons. The Xerox "hammer-impression" typewriters, known as 800 ETS, comprise a plastic image wheel having a "daisy" appearance, each of the "petals" comprising a type face and being flexible. The "daisy" spins in response to signals from a computer and the rear surface of the "petals" is struck by a piston or hammer to force the appropriate type face on the front of the "petal" against the rear surface of the ribbon and to force the imaging layer of the ribbon against the copy sheet. Thus, the imaging force of the piston or hammer is first imparted to the plastic image wheel, then to the ribbon and finally to the copy sheet. Images are produced at the rate of about 40 per second. Other similar electronic typing devices, which function in a manner similar to the Xerox machine, are also commercially-available and provide better results when using the present ribbons.

The present inks are exceptionally heavy-bodied or dense and are used in smaller amounts, relative to the resin content, than is generally the case with conventional reusable typewriter ribbons, i.e., in a ratio of about 2:1, rather than the more conventional ratio of about 3:1. Thus, the present ink layers have a resin content which is higher than usual and are stronger, tougher and more resistant to picking over or flaking of the resin structure during typing or printing use. Also, the thickness of the ink, coupled with the strength of the resin structure, appears to provide a resistance to complete compression of the ink layer under each printing pressure, whereby a uniform metering of the ink occurs under each impression, with residual ink remaining for subsequent transfer in overstruck areas. Also, the high adhesive, low cohesive properties of the ink and the uniform high dispersion of the pigment and wetting agent therein permits small intense amounts of uniform ink to adhere to and penetrate and stain the copy sheet surface in the form of clean, sharp, smudge-resistant images, the portions of the ink in adhered to the copy sheet freely separating from the ink remaining in the ink layer when the typing pressure is withdrawn.

DESCRIPTION OF A PREFERRED EMBODIMENT

The following example is given as illustrative and should not be considered limitative:

| Ingredients | Parts by Weight |
|---|---|
| Vinyl chloride-vinyl acetate copolymer (Vinylite VYHH) | 12.0 |
| Mineral oil | 7.0 |
| Lanolin | 7.0 |
| Alkaline blue pigment toner | 1.0 |
| Untreated carbon black pigment | 6.0 |
| Inert filler | 2.0 |
| Sulfonated vegetable oil (wetting agent) | 1.5 |
| Naphtholite vehicle | 2.5 |
| Methyl ethyl ketone solvent | 61.0 |
| | 100.0 |

The above ingredients, excluding the methyl ethyl ketone, were mixed in a ball mill and ground together until highly dispersed. Then the methyl ethyl ketone was added and the composition was ground to form a uniform coating composition.

The film foundation comprises 30 gauge tensilized Mylar (polyethylene terephthalate which is oriented in both directions and has a thickness of 0.3 mil). The foundation is coated on one surface with a thin layer comprising 1 part by weight of a linear polyester resin, such as Vitel resin 5545, about 0.1 part by weight of a vinyl resin, such as Vinylite VYHH resin copolymer, a solvent such as methyl ethyl ketone and filler, if desired. The layer is dried by evaporation of the solvent to leave a continuous thin bonding layer having a thickness of about 0.00005 inch on the Mylar surface.

The ink coating composition is applied over the bonding layer on the film foundation as a uniform thin layer in an in-line coating operation during a single pass of the film through the coating machine. This is preferred, since the bonding layer is somewhat sticky unless filler is included to reduce tack. The methyl ethyl ketone is evaporated first and then the naphtholite is evaporated to form the ink layer having a thickness of from about 0.0002 inch up to about 0.0008 inch, preferably about 0.0005 to about 0.0006 inch. The ink layer comprises a microporous, pressure-non-transferable network of the vinyl copolymer containing within the pores thereof a pressure-exudable ink having a viscosity of over about 400,000 centipoises comprising the mineral oil, lanolin, wetting agent and pigments.

The coated, dried film is then cut into ribbons of the desired length and width for use in the high speed electronic typewriters discussed hereinbefore, conventional widths being ¼ inch, 5/16 inch and ½ inch, depending upon the requirements of the particular typewriter.

It should be understood that the present invention is not limited to the specific ink ingredients of the foregoing Example and that other semi-solid oleaginous materials and other liquid oils can be used in slightly variable proportions which, together with the particular wetting agents and colorants, result in a non-flowable, substantially-solid thixotropic ink having a viscosity between about 100,000 centipoises and about 1,000,000 centipoises. Among the other semi-solid materials which can be used are petrolatum and hydrogenated vegetable oils; among the other liquid oils which can be used are cottonseed oil, rapeseed oil, sperm oil, castor oil and butyl stearate. Preferably, the ink vehicle comprises a mixture of the semi-solid material and the liquid oil, these materials being present in nearly equal or equal amounts, i.e., 1 part by weight of the semi-solid material and from about 0.5 to about 1.2 parts by weight of the liquid oil. However, the semi-solid material may be used alone or in combination with small amounts of the liquid oils, provided that the ink is substantially-solid, thixotropic and has the required viscosity.

The content of the wetting agent will vary from about 0.3% up to about 5% by weight of the total coating composition depending upon the specific wetting agent used. Certain materials, such as sulfonated vegetable oils and the diisopropyl naphtholene napthaline sulfonate and sorbitan esters require larger amounts in the high end of the range. In all cases, the wetting agent is insoluble in the specific volatile coating solvents used for the resinous binder but is soluble in a less-volatile, miscible liquid. It contains both a hydrophilic or water-loving radical and an oleophilic or oil-loving radical so as to have a strong affinity for both the hydrophilic pigment and oleaginous ink vehicle. If desired, the present compositions may also contain another wetting agent which is soluble in the active solvent for the resin, such as lecithin. Such wetting agent, when used in an amount equal to or less than the prime wetting agent, appears to improve the color intensity or uniformity of dispersion of the ink within the porous resin structure, as well as the uniformity of dispersion of the pigments within the oleaginous ink vehicle.

In use, the present ribbons are found to have excellent tensile strength, resistance to breakage and resistance to elongation. The ink layer will not chip or flake from the film foundation, and the images produced therefrom are of uniform color intensity, have excellent sharpness or edge profile and resistance to smudging during handling of the copy. It appears that the overall thinness of the present ribbons provides reduced resistance to the rapid operation of the type element so that ink is exuded more easily and more uniformly than with prior thicker reusable ribbons. Also, the highly dispersed, low cohesive ink is better able to transfer from the ink layer and to separate therefrom in metered uniform amounts during the rapid, overlapping impact operation of the electronic typewriters. This is unexpected and permits the formation of images of uniform color intensity and increased sharpness.

Variations and modifications may be made within the scope of the claims and portions of the improvements may be used without others.

We claim:

1. Thin, pressure-sensitive, ink-releasing transfer element adapted for use in a hammer-impression, high speed electronic typewriter of the overstrike type comprising a film foundation having a uniform thickness within the range of from about 0.0001 inch to about 0.0005 inch, a continuous bonding layer of synthetic thermoplastic resin having a uniform thickness of up to about 0.0001 inch present on one surface of said foundation, and a volatile vehicle-applied pressure-sensitive, ink-releasing microporous layer having a uniform thickness of up to about 0.0008 inch present on said continuous bonding layer, said microporous layer comprising a non-transferable porous network of vinyl chloride-vinyl acetate copolymer binder material containing within the pores thereof a pressure-exudable thixotropic, substantially-solid ink comprising a semi-solid oleaginous ink vehicle which is substantially incompatible with said resin binder material, a wetting agent having both hydrophilic and oleophilic groups and a quantity of coloring matter comprising a hydrophilic pigment, said semi-solid ink being a thick paste having low cohesive strength and a viscosity between about 100,000 and 1,000,000 centipoises at ordinary room temperatures, said volatile vehicle comprising a miscible mixture of (a) a volatile liquid solvent which is a solvent for said binder material and for said oleaginous ink vehicle but is a non-solvent for said wetting agent, and (b) a less volatile liquid which is a solvent for said oleaginous ink vehicle and for said wetting agent but is a non-solvent for said binder material and which has a boiling point at least about 30° F. higher than the boiling point of said volatile liquid solvent but which is below the boiling point of said oleaginous ink vehicle whereby the evaporation of said volatile liquid solvent produces said microporous structure of the binder material containing said oleaginous ink vehicle and the subsequent evaporation of said less volatile liquid causing said wetting agent and coloring matter to be selectively mixed with said oleaginous ink vehicle to form said ink.

2. Transfer element according to claim 1 in which said wetting agent comprises a liquid sulfonated vegetable oil.

3. Transfer element according to claim 1 in which said volatile vehicle comprises a major amount by weight of methyl ethyl ketone as said solvent and a minor amount by weight of said less volatile liquid.

4. Transfer element according to claim 1 in which said hydrophilic pigment comprises an untreated carbon black.

5. Transfer element according to claim 1 in which said film foundation comprises oriented polyethylene terephthalate having a uniform thickness of from about 0.00019 inch to about 0.00035 inch.

6. Transfer element according to claim 1 in which said microporous layer has a uniform thickness of from about 0.0005 inch to about 0.0006 inch.

7. Transfer element according to claim 1 in which said bonding layer comprises a linear polyester resin.

8. Transfer element according to claim 1 in which said ink vehicle comprises a mixture of 1 part by weight of a semi-solid, non-flowable oleaginous material, and from about 0.5 to 1.2 parts by weight of a liquid oil.

9. Transfer element according to claim 8 in which said semi-solid oleaginous material comprises lanolin.

10. Transfer element according to claim 8 in which said semi-solid ink contains substantially-equal amounts of said semi-solid material and said liquid oil and has a viscosity of from about 300,000 to 600,000 centipoises.

11. Process for producing a thin, pressure-sensitive, ink-releasing transfer element adapted for use in a hammer-impression, high-speed electronic typewriter of the overstrike type comprising the steps of:

(a) preparing an ink coating composition by uniformly mixing together a vinyl chloride-vinyl acetate binder material, a thixotropic, substantially-solid ink having a viscosity between about 100,000 centipoises and 1,000,000 centipoises and comprising a semi-solid, non-flowable oleaginous material, a wetting agent having both hydrophilic and oleophilic groups and coloring matter comprising a hydrophilic pigment, and a substantial amount of a volatile coating vehicle comprising a miscible mixture of (1) a volatile liquid solvent which is a solvent for said binder material and for said oleaginous ink vehicle but which is a non-solvent for said wetting agent and (2) a less volatile liquid which is a solvent for said oleaginous ink vehicle and for said wetting agent but is a non-solvent for said binder material and which has a boiling point at least about 30° F. higher than said volatile liquid solvent;

(b) preparing a flexible film foundation by coating a thin film having a thickness of from about 0.0001 inch up to about 0.0005 inch with a continuous thin bonding layer of composition comprising a synthetic thermoplastic resin dissolved in a volatile organic solvent which is a non-solvent for said thin film, and evaporating said solvent to form a uniform bonding layer having a thickness of up to about 0.0001 inch present on said thin film;

(c) applying said ink-coating composition to the surface of said bonding layer as a uniform, thin, continuous layer and sequentially evaporating said volatile liquid solvent first to cause said soluble resin binder material and oleaginous ink vehicle to selectively migrate to the surface of the ink layer and form a microporous structure of said binder material containing said ink vehicle within the pores thereof, and then evaporating said less volatile liquid to cause said soluble wetting agent and coloring matter to be carried into said pores, due to the solubility of said ink vehicle in said less volatile liquid, and to be selectively deposited therein as said less volatile liquid is evaporated to form a microporous layer of said binder material having a uniform thickness within the range of from about 0.0002 inch to about 0.0008 inch and containing within the pores thereof said semi-solid, non-flowable ink which is transferable to a copy sheet in metered amounts under the effects of the hammer-impression of a high speed electric typewriter.

12. Process according to claim 11 in which said volatile coating vehicle comprises a major amount by weight of methyl ethyl ketone as said solvent and a minor amount by weight of said less volatile liquid.

13. Process according to claim 11 in which said wetting agent comprises a liquid sulfonated vegetable oil.

14. Process according to claim 11 in which said hydrophilic pigment comprises an untreated carbon black.

15. Process according to claim 11 in which said bonding layer composition comprises a linear polyester resin as said thermoplastic resin.

16. Process according to claim 11 in which said ink vehicle comprises a mixture of 1 part by weight of a semi-solid, non-flowable oleaginous material and from about 0.5 to 1.2 parts by weight of a liquid oil.

17. Process according to claim 16 in which said semi-solid, non-flowable material comprises lanolin.

* * * * *

UNITED STATES PATENT AND TRADEMARK OFFICE
CERTIFICATE OF CORRECTION

PATENT NO. : 4,217,388

DATED : August 12, 1980

INVENTOR(S) : Michael A. Scott, Albert E. Brown, Edward Young

It is certified that error appears in the above-identified patent and that said Letters Patent are hereby corrected as shown below:

Col. 2, line 5, "hydraulic" should be --hydrophilic--;
col. 2, line 29, "providing" should be --producing--;

col. 6, line 3, delete "in" after the word "ink";
col. 7, line 18, "naphtholene naphthaline" should be --naphthalene--;

Signed and Sealed this

*Twenty-fifth* Day of *November 1980*

[SEAL]

*Attest:*

SIDNEY A. DIAMOND

*Attesting Officer* *Commissioner of Patents and Trademarks*